June 10, 1924.

C. C. FARMER

TRAIN PIPE COUPLER

Filed Aug. 26, 1921

1,496,929

INVENTOR
CLYDE C. FARMER
BY
ATTORNEY

Patented June 10, 1924.

1,496,929

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

TRAIN-PIPE COUPLER.

Application filed August 26, 1921. Serial No. 495,576.

*To all whom it may concern:*

Be it known that I, CLYDE C. FARMER, a citizen of the United States, residing at Pittsburgh, in the county of Allegheny and State of Pennsylvania, have invented new and useful Improvements in Train-Pipe Couplers, of which the following is a specification.

This invention relates to pipe couplers and more particularly to an automatic train pipe coupler.

The principal object of my invention is to provide means for permitting the renewal of a defective or leaky connection gasket without uncoupling the cars.

Figure 1:
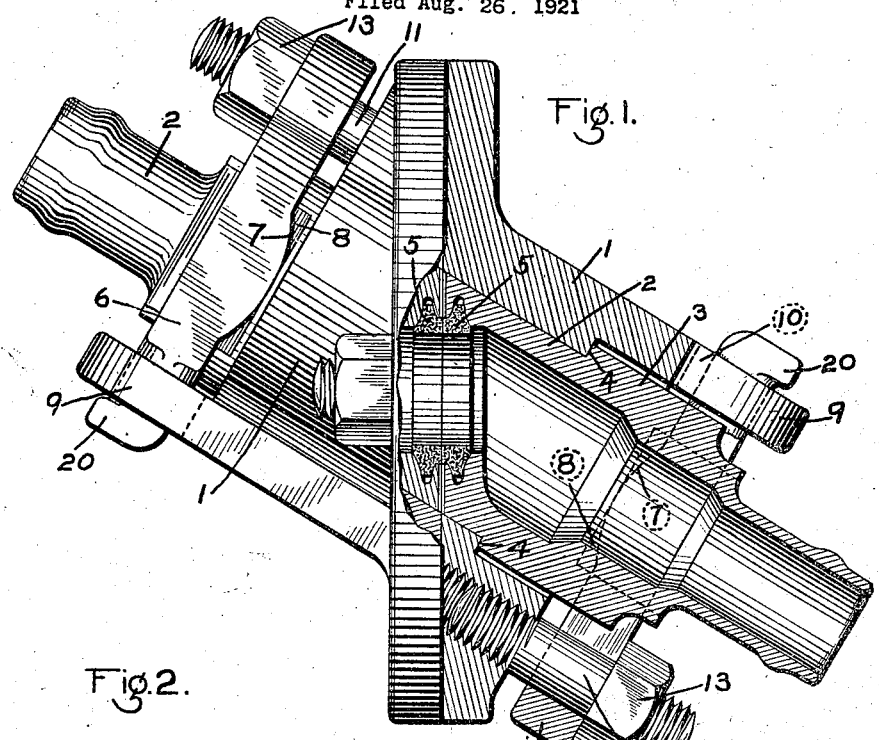
Figure 2:
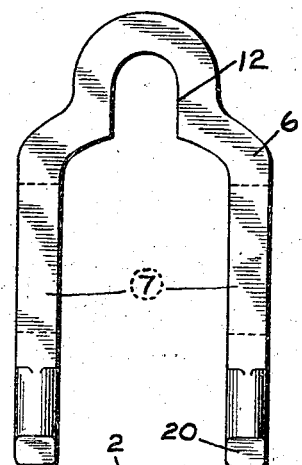
Figure 3:
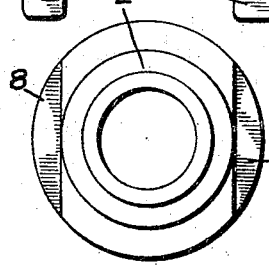

In the accompanying drawing; Fig. 1 is a plan view, partly in section of a pair of coupler heads in the coupled position, with my improvement applied thereto; Fig. 2 an elevational view of the locking wedge member; Fig. 3 a face view of the train pipe connector member; and Fig. 4 a central sectional view of a coupler head with a slightly modified form of my invention applied thereto.

The coupler head shown in Fig. 1 of the drawing is of the type in which the longitudinal axis of the coupler head is at an oblique angle to the meeting face of the head and comprises a body casting 1 having a central bore for receiving a conduit connection 2 adapted to be connected to the usual flexible hose. The connection 2 is provided with an enlarged cylindrical portion 3, forming a flange adapted to bear against an annular shoulder 4 of the body casting 1 and at the face of the connection there is provided an annular groove for receiving the usual gasket 5.

The connection 2 is held in position in the coupler head by means of a yoke 6, the legs of which are provided with rounded projections 7 adapted to bear against flat faces 8 of the connection 2, which are formed by cutting away portions of the connection, as clearly shown in Fig. 3.

At one side, the casting 1 is provided with lugs 9 having apertures 10 for receiving the legs of the yoke 6 and at the opposite side a stud 11 is screwed into the casting and when in position, a contracted portion 12 of the yoke fits over the stud.

When the connection 2 has been positioned in the casting 1, the yoke 6 is slipped over the stud 11 and the legs of the yoke are passed through the openings 10 in the lugs 9, so that the projections 7 engage the faces 8 of the casting. The nut 13 is then screwed up on the stud 11, so as to firmly clamp the connection 3 in position.

If a gasket 5 becomes worn and defective or leaks, requiring the renewal of the gasket, the connection 3 may be readily removed, without uncoupling the cars, by backing off the nut 13, so that the yoke 6 may be withdrawn. The connection 3 may then be pulled away from the coupler head and the defective gasket replaced. After the gasket is renewed, the connection 3 is inserted in position in the casting 1 and the yoke 6 is applied and then secured in position by the nut 13, as hereinbefore described. The yoke 6 may be provided with lugs 20 at the ends of the legs, for the purpose of holding the yoke against possible displacement.

Figure 4:
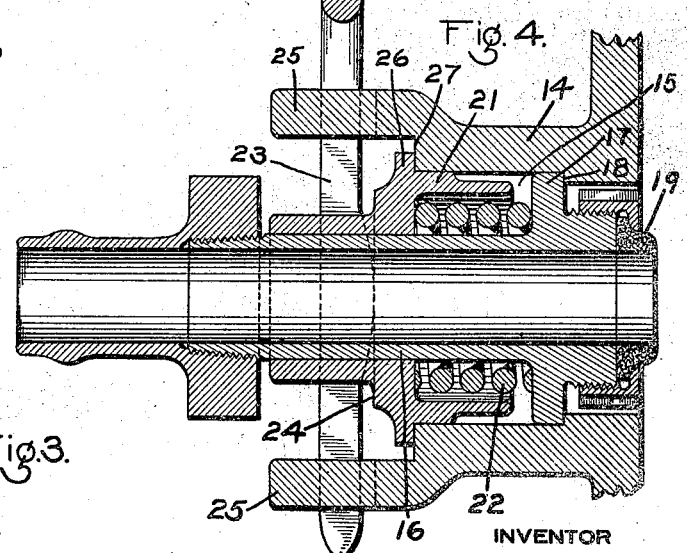

According to the construction shown in Fig. 4, the coupler head is of the type having its meeting face at right angles to the longitudinal axis of the coupler head and comprises a body casting 14 having a recessed bore 15. The pipe connection 16 is provided with an annular flange 17 adapted when in position to engage the annular shoulder 18 of the recessed bore of the casting and the connection carries at its face a gasket 19.

Mounted on the connection 16 is a sleeve 21 and interposed between the sleeve and the flange 17 is a coil spring 22 for yieldingly maintaining the connection 16 in position. A yoke 23 is provided for engaging an annular face 24 of the sleeve member 21 and the casting 14 is provided with lugs 25 at opposite sides of the casting and having apertures for receiving the legs of the yoke.

In assembling the parts, the connection 16 with the applied sleeve 21 and the spring 22 are positioned in the casting 14 and the yoke 23 is then driven through the apertures in the lugs 25. The sleeve member 21 is thereupon moved forwardly until the flange 26 engages the shoulder 27 of the casting 14. The spring 22 is thus compressed and its force is exerted on the connection 16 to yieldingly hold the same in place.

If it is desired to renew the gasket 19, the yoke 23 is driven out and the connection 16 is withdrawn and after the gasket is renewed the connection 16 may be returned to its position and locked there by the yoke 23, as will be evident.

Having now described my invention, what

I claim as new and desire to secure by Letters Patent, is:—

The combination with a train pipe coupler head having lugs provided with apertures, of a train pipe connector removably mounted in said head, a yoke having its legs spaced apart to engage the apertures in said lugs, each leg being provided with a raised portion adapted to engage said train pipe connector, a screw-threaded stud carried by said coupler head and extending through the opening formed by the lugs of the yoke, and a nut on said stud for clamping said yoke in position.

In testimony whereof I have hereunto set my hand.

CLYDE C. FARMER.